Jan. 20, 1970  R. W. GRAFF ET AL  3,490,973
METHOD AND APPARATUS FOR PRODUCING HOLLOW
BODIES OF FIBER-REINFORCED PLASTICS
Filed July 23, 1963  5 Sheets-Sheet 5

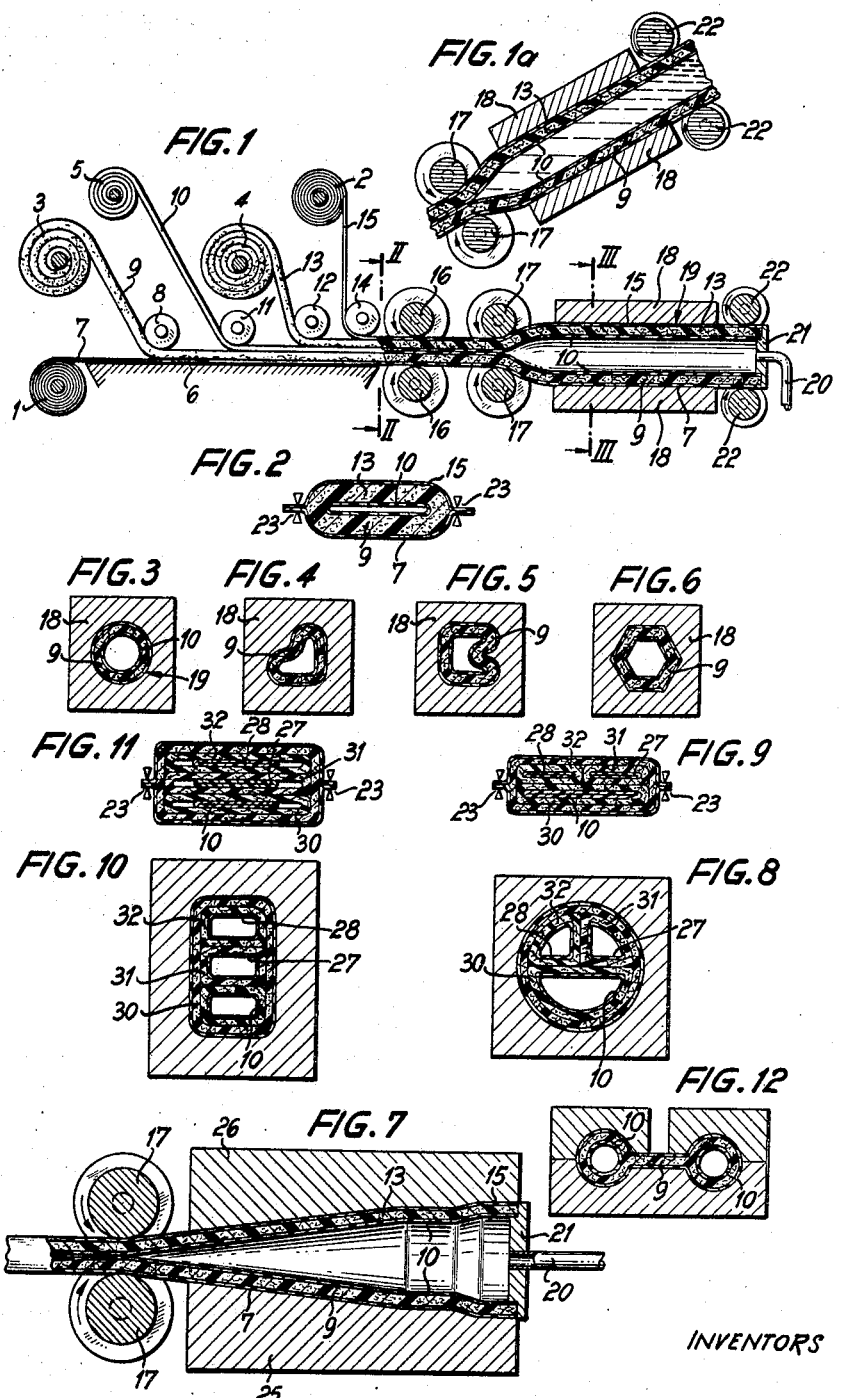

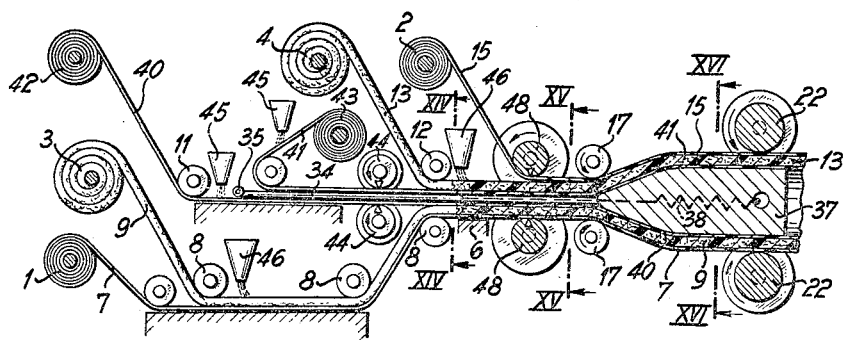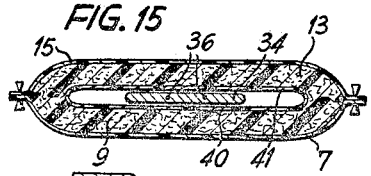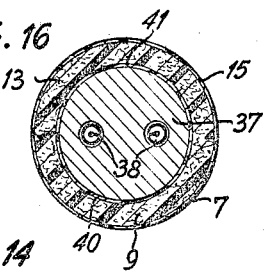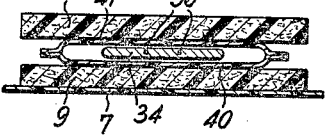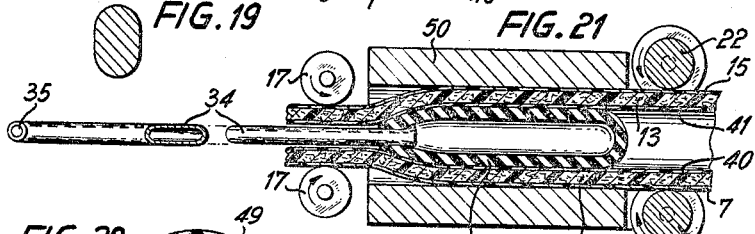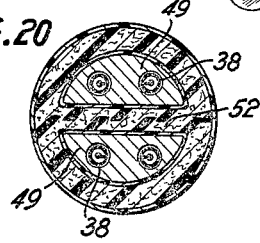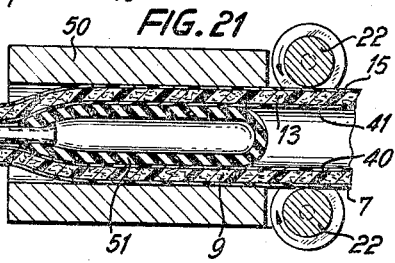
INVENTORS
RODERICH WILHELM GRÄFF
LUDOLF REINECKE
KARL JOHANN REICHL
ATTORNEYS

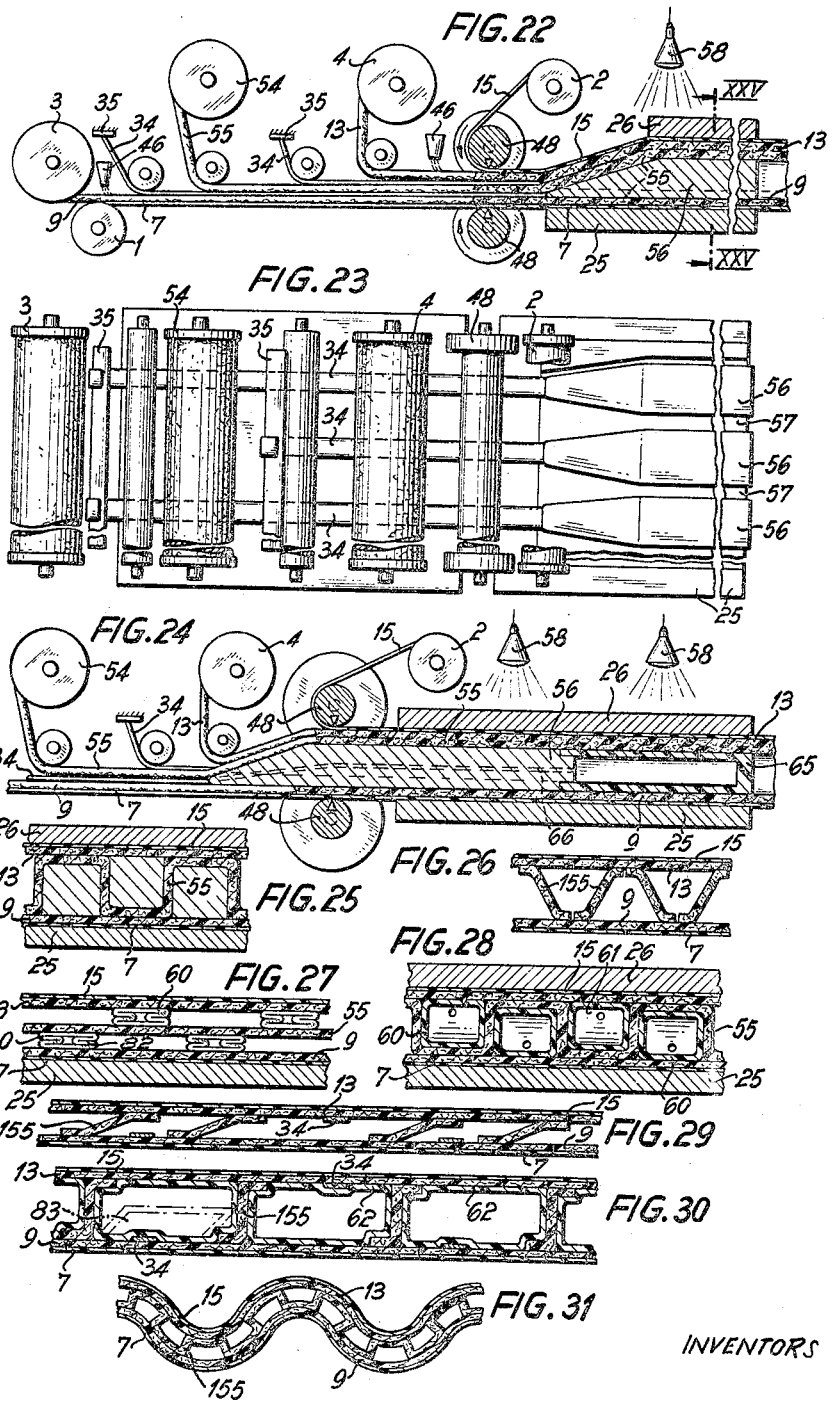

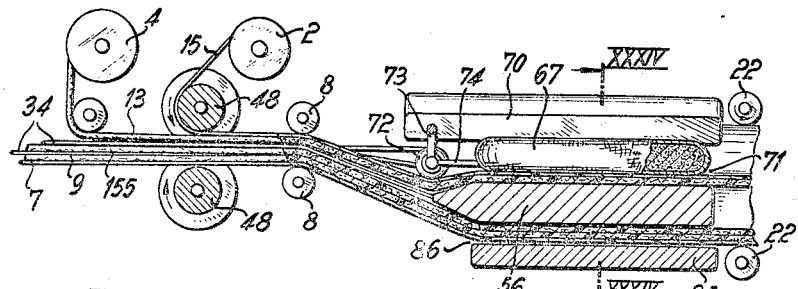
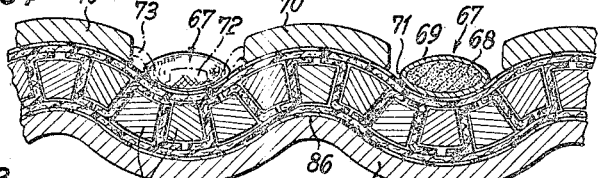
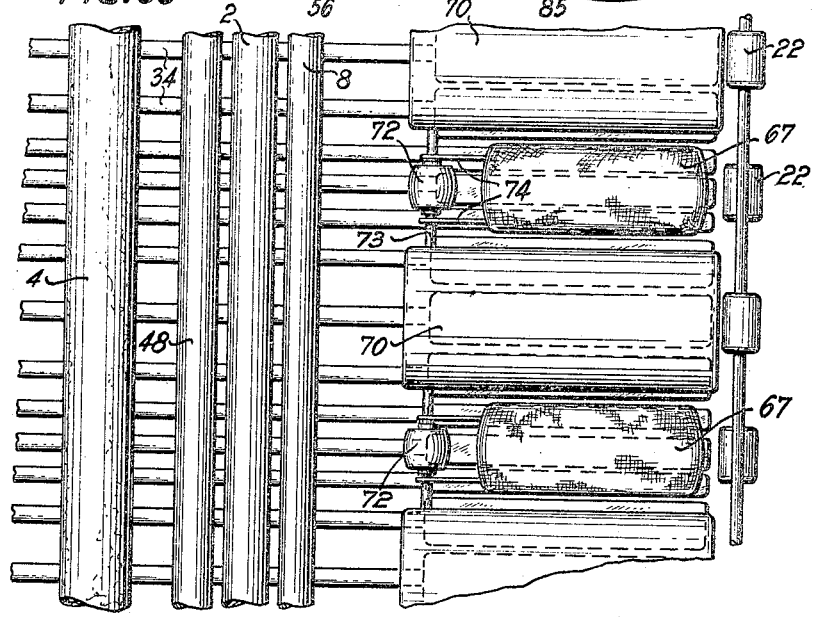

INVENTORS
RODERICH WILHELM GRÄFF
LUDOLF REINECKE
KARL JOHANN REICHL

McGlew and Toren
ATTORNEYS

United States Patent Office 3,490,973
Patented Jan. 20, 1970

3,490,973
METHOD AND APPARATUS FOR PRODUCING HOLLOW BODIES OF FIBER-REINFORCED PLASTICS
Roderich Wilhelm Graff, 51 Graupnerweg, Darmstadt, Germany, and Ludolf Reinecke, 3 Friedrich-Ochs-Strasse, and Karl Johann Reichl, 4 Regensburger Strasse, both of Weiden, Germany
Filed July 23, 1963, Ser. No. 297,130
Int. Cl. B29d 23/02; B32b 31/20
U.S. Cl. 156—156                               18 Claims The present invention relates to a method of and apparatus for, continuously producing hollow bodies from fiber reinforced curable synthetic resins.

It is known to produce hollow bodies from fiber-reinforced synthetic resin progressively in the following manner. First of all, a laminate is formed, consisting of two layers of fibrous material which is impregnated with liquid curable synthetic resin and which is covered on all sides. Between the two layers of the laminate, an internal molding pressure is exerted in a hollow mold, this pressure forcing the laminate against the internal wall of the hollow mold so that a hollow body is formed. In this already disclosed method, the internal pressure is produced by a flexible tube, which is folded flat, being laid between the tube layers of the laminate at the time of production. This tube is expanded in the hollow mold by a medium under pressure, for example, compressed air, or a flowable medium, for example, sand. It is also possible to place several such tubes either one above the other, or adjacent to one another, or with tubes disposed one above the other and tubes disposed also adjacent to one another, in spaced relation, and to separately expand these tubes so that hollow bodies are formed which have cavities or passages separated by webs.

The invention is directed to a further development and improvement of this method, in which the internal pressure between the layers of the laminate is produced by at least one forming body or molding core which penetrates between the layers of the laminate while the laminate is being moved relatively to the forming body. If desired, the method can be so performed that a flattened flexible tube is placed between the layers of the laminate, as in the method described above, with this tube being expanded by a molding core or forming body penetrating thereinto.

In accordance with the invention, there is provided a method for producing elongated hollow articles from fibrous material impregnated with a fluid, curable synthetic resin by preparing a laminate consisting of at least two superposed layers of impregnated fibrous material enclosed by a film of plastic material, and expanding this laminate by applying an internal forming pressure between the fibrous layers of the laminate by at least one forming body entering in between such fibrous layers of the laminate while the laminate is moving relative to the forming body.

The outer layers and the flat tubular layer between them may consist of any ductile materials, for example, cellophane, polyethylene, polyvinyl chloride, polyvinyl alcohol, or cellulose aceto butyrate. The reinforcing material may consist of mats, fabrics, or other products which are made, for example, on a base of silicates and synthetic, especially glass fibers, asbestos fibers, or mineral fibers. The impregnation of the flat reinforcing material may be effected in a conventional manner by means of liquid resin pre-condensates, for example, those on a basis of phenoplasts or aminoplasts, epoxy resins, methacrylate resins, or polyesters, which may be cured at a normal temperature or under heat, either with or without the addition of catalysts.

The invention is also directed to apparatus for carrying out this method, and comprising means for forming a laminate comprising at least two superposed layers of impregnated fibrous material enclosed by a film of plastic material, a forming body for applying pressure between the layers of impregnated fibrous material, and means for suspending the forming body in cantilever fashion between the layers of impregnated fibrous material. The forming body or molding core may be either a rigid inherently stable mold or core, or a yieldable core. In both cases, the forming body or molding core is suspended, in cantilever fashion, by a flexible or yieldable folding element. The yieldable molding core may be filled with a fluid medium by which it is expanded. In such case, the holding element serves simultaneously for supplying a pressure fluid medium to the interior of the molding core. The molding core can be arranged inside an external hollow mold element.

Instead of imbedding the flattened flexible tube in the laminate, the method can be effected by a molding core over which the laminate is drawn, this molding core being provided with a covering or coating which is fixed relative to the core.

For the production of hollow bodies with a plurality of partitions extending longitudinally therein, the molding pressure internally of the laminate may be produced by a series of molding cores which are arranged side-by-side across the width of the laminate.

In one particular form of the method, the hollow body is produced from three impregnated layers, of which the inner layer is shaped by the molding cores into longitudinally extending webs between the two outermost layers, with uniting being effected by a curing and hardening process so that the partition is formed with longitudinally extending cavities within the molded bodies. The middle layer can also be covered by a film.

In a preferred embodiment of the method, the middle layer is easily stretchable transversely, while it is capable of only limited stretching longitudinally. The middle layer can be divided into a plurality of separate strips.

With an arrangement for forming partitions inside the hollow body, the molding cores are preferably staggered vertically relative to one another by a spacing equal to the thickness of the partition-forming web.

The fixing means of the molding cores are arranged in two vertically spaced places, in accordance with the invention, so that a fixing means in the lower plane and a fixing means in the upper plane are irregularly connected to shaping cores, the cores being arranged side-by-side with a spacing corresponding to the web thickness.

In one particular embodiment, a plurality of flat, expandable, elastic cores are placed between the layers of the laminate, the cross section of the cores being substantially square or rectangular after being expanded.

In a modification of the method, the staggered molding cores are expandable and yieldable tubes, which are placed between the layers of the laminate and are filled with a flowable medium.

As a further feature of the invention, hollow bodies formed with webs can be made with a corrugated cross section. For this purpose, there may be provided a slideway having a corrugated surface and a plurality of stationary yieldable loading bodies may also be provided and there are suspended, cantilever fashion, and are associated with troughs of the corrugations of the shaping surface so as to force the laminate against the troughs during the shaping operation.

In an arrangement having solid molding cores or forming bodies, an extension can be arranged on the rearward end of the cores, and this extension can be expanded by internal pressure.

It is know that air inclusions can be removed from a resin-impregnated laminate by squeezing rolls. In one particular embodiment of the invention, the squeezing rolls are arranged near the zone in which the molding cores enter the laminate.

The aforementioned as well as numerous additional features and advantages of the present invention will become more clearly apparent from the following detailed description thereof which is to be read with reference to the accompanying drawings, in which—

FIGURE 1 shows diagrammatically and partly in section a side view of a known apparatus in which the flat tubular body with laminated walls is expanded and hardened by means of a gaseous or liquid pressure medium within a molding chamber;

FIG. 1a is a sectional view illustrating a partial modification of FIG. 1;

FIGURE 2 shows an enlarged cross section taken along line II—II of FIGURE 1;

FIGURES 3 to 6 show cross sections of several molds containing differently shaped molding chambers, and also of the expanded tubular walls of the molded bodies within these molding chambers;

FIGURE 7 shows a longitudinal section of a mold for producing conical hollow bodies;

FIGURES 8 and 10 show cross sections of two different molds, each with a molded hollow body therein which is divided by partitions into several channels;

FIGURES 9 and 11 show cross sections of the laminated tubular walls of the molded bodies according to FIGURES 8 and 10, respectively, before being expanded;

FIGURE 12 shows a cross section of a divided mold in the molding chamber of which two parallel tubular bodies with a web connecting the same are formed;

FIGURE 13 shows diagrammatically and partly in section a side view of an apparatus according to one modification of the invention;

FIGURES 14, 15 and 16 show cross sections taken in FIGURE 13 along lines XIV—XIV, XV—XV, and XVI—XVI, respectively;

FIGURES 17 to 19 show cross sections of different molding elements which may be employed in the apparatus according to FIGURE 13;

FIGURE 20 shows a cross section of a molded body which has been expanded by means of two molding cores;

FIGURE 21 shows a cross section of a mold and a hollow inflatable molding core for an apparatus similar to that as shown in FIGURE 13;

FIGURE 22 shows diagrammatically and partly in section a side view of another modification of the apparatus according to the invention;

FIGURE 23 shows a plan view of the apparatus according to FIGURE 22;

FIGURE 24 shows diagrammatically and partly in section a side view of an apparatus according to a modification of the apparatus as shown in FIGURES 22 and 23;

FIGURES 25 and 26 show cross sections taken along lines XXV—XXV of FIGURE 22;

Figure 35:
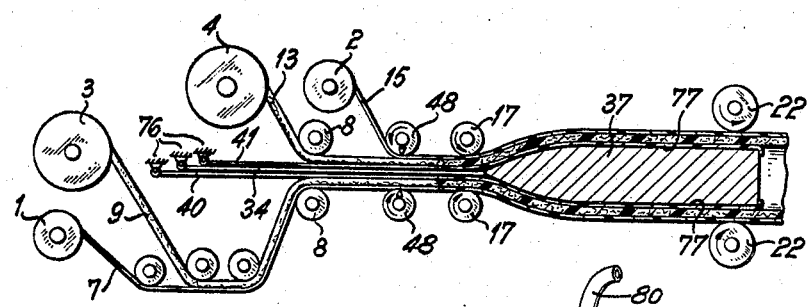
Figure 37:
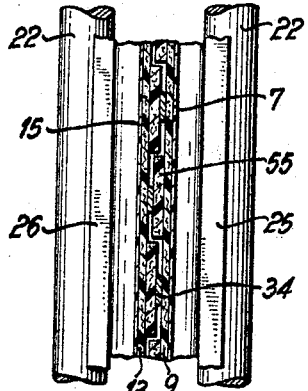
Figure 36:
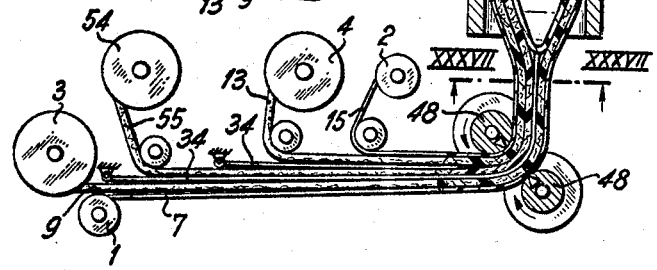

FIGURES 27, 28 and 29, 30, respectively, show cross sections of two channeled products in the uninflated or partly inflated condition and in the fully inflated final condition, respectively;

FIGURE 31 shows a cross section of a hollow molded product of a wavy or corrugated shape;

FIGURE 32 shows diagrammatically and partly in section a side view of an apparatus for producing the product according to FIGURE 31;

FIGURE 33 shows a plan view of the apparatus according to FIGURE 32 in which the molded body is omitted;

FIGURE 34 shows a cross section which is taken along line XXXIV—XXXIV of FIGURE 32;

FIGURE 35 shows diagrammatically and partly in section a side view of a modification of the apparatus according to FIGURE 13;

FIGURE 36 shows a similar view of a modification of the apparatus according to FIGURES 22 and 23; while FIGURE 37 shows a cross section which is taken along the line XXXVII—XXXVII in FIGURE 36.

FIGS. 1–12 illustrate the mentioned already disclosed method and apparatus.

As illustrated in FIGURE 1, the webs of the material or materials which are required for producing the laminated wall of a tube are drawn off the reels 1, 2, 3, 4, and 5. In order to place the webs in the desired position relative to each other, at first the outer web 7 of sheet plastic is fed from the reel 1 to the stationary support 6 on which the laminating is carried out. A web 9 of a reinforcing material which is impregnated with synthetic resin is then fed from reel 3 and applied by a guide roll 8 upon the outer web 7, while upon this web 9 a flattened tubular web of plastic 10 which is supplied from reel 5 is then applied by the guide roll 11. By the pressure of this guide roll 11, the laminations 7, 9, and 10 are pressed upon each other and any possible air bubbles which might be entrapped between them are expelled. This laminated wall portion of the tubular body to be produced is then covered with another web 13 of resin-impregnated reinforcing material which is drawn off the reel 4 and applied upon the layer 10 by the guide roll 12. Web 13 is then, in turn, covered by the other outer web 15 of plastic which is drawn off the supply reel 2 and applied by the guide roll 14.

The laminated webs are then passed between two pairs of rolls 16 and 17 which squeeze off the excessive resin and expel any air which might still be entrapped between the webs. These rolls 16 and 17 also mold the webs into a tubular body, as shown in FIGURE 2, and especially they weld together the edges of the two outer plastic webs 7 and 15, as indicated at 23 in FIGURE 2. Following the pair of rolls 17, the laminated webs pass into the molding chamber 19 which is enclosed by the mold 18 and in which the flat tubular body is expanded to the desired cross-sectional shape. FIGURE 1 indicates that the pressure medium for carrying out this expansion, which may consist either of a gas or a liquid, is conducted into the body to be molded, the material of which is already partly cured so as to maintain its shape, through a line 20 and a head 21 which closes the end of the tubular body. A pair of driven feed rolls 22 then continuously draws the expanded tubular plastic body in its stiff final condition from the apparatus. The continuous production needs to be interrupted only temporarily if behind the mold 18 a certain length of the tubular body is to be cut off and the closing head 21 with line 20 thereon therefore has to be taken off and then reapplied on the uncut tube.

The entire method may also be carried out in such a manner that the mold 18 according to FIGURE 1 is inclined in the upward direction, as shown in FIGURE 1a, so that a constant level of liquid is maintained within the tube 10. The flat tubular body is then passed into the mold 18 from below and expanded therein by the liquid which is filled into the end of tube 10.

FIGURES 3 to 6 show several examples of tubular bodies of different cross-sectional shapes which may be produced by the method and apparatus, as illustrated in FIGURE 1. Obviously, in order to attain any of these cross-sectional shapes, it is necessary to make the flat tubular web 10 according to FIGURE 2 of a smaller width than webs 9 and 13 of resin-impregnated reinforcing material and the outer webs 7 and 15 of plastic.

FIGURE 7 shows a two-part mold 25, 26 which permits the production of tubular bodies of a partly conical and partly cylindrical shape. The molding chamber is accordingly made in the longitudinal direction partly of a conically diverging shape and partly of a cylindrical shape with different inner diameters. The production of such a tubular body is carried out in steps.

For producing the tubular bodies which are shown in FIGURES 9 and 11 in the unexpanded condition and in FIGURES 8 and 10 in the expanded condition, it is necessary to insert additional webs 30, 31, and 32 of resin-impregnated reinforcing material between the tubular webs of plastic 10, 27, and 28.

The apparatus of the invention, as shown in FIG. 13, differs from that shown in FIGURE 1 primarily by the employment of a mold with a solid molding core for expanding the flat tubular body to the desired shape. A comparison of the apparatus according to FIGURE 13 with that according to FIGURE 1 shows the additional provision of a supporting band 34 which is secured at 35 for attaining a flying or cantilever suspension of the molding core. As indicated particularly in FIGURES 14 and 15, this supporting band 34 may contain electric conductors 36 leading to the molding core 37 for transmitting electric heating energy to a heating element 38 within the core, as shown in FIGURES 13 and 16.

The continuous operation of the apparatus according to FIGURE 13 is similar to that according to FIGURE 1, and for this reason the equivalent elements in both figures are identified by the same reference numerals. The additional employment of the supporting band 34 is possible due to the fact that, instead of a tubular plastic web 10, two plastic webs 40 and 41 are supplied—at first separately from each other—from the reels 42 and 43 via associated guide rolls so that web 40 will lie underneath and web 41 above the supporting band 34. The two plastic webs 40 and 41 are then welded together along their edges by the pair of rolls 44 and then fully enclose the supporting band 34 and form a single tubular web. Directly after the edges of webs 40 and 41 are welded together, the projecting parts thereof are cut off. Lubricant is supplied to web 40 as indicated at 45. At 46, the reinforcing webs 9 and 13 may be impregnated with plastic. Thereafter, by means of the pair of rolls 48, the edges of the outer plastic webs 7 and 15 are also welded together. After then passing through a pair of rolls 17, the laminated layers pass over the molding core in the form of a rigid element 49. Due to the pressure which is exerted by the molding core upon the inner wall of the tubular body when the latter is drawn over it by the rollers 22, the tubular body is expanded and formed to its desired shape in accordance with the particular shape of the molding core, which may be either of a circular cross section, as shown in FIGURE 16, or of any other shape as shown, for example, in FIGURES 17 to 19.

Whereas the apparatus according to FIGURE 13 operates without any outer mold enclosing the expended tubular body and acting upon the outer surface thereof, the apparatus as illustrated in FIGURE 21 operates with such a mold 50 through which the expanded tubular and partly hardened body is drawn by means of the pair of rolls 22. The molding chamber of this mold 50 is provided with a hollow molding core 51 of a flexible or ductile material. In this case, the supporting band 34 consists of a flat tube to which a pressure medium is supplied through its fixed end 35. The internal pressure in the molding core 51 may be adjustable. Mold 50 may also be heated electrically.

The principal difference between the apparatus according to FIGURE 13 and that according to FIGURE 21 is that the tubular body produced by the apparatus according to FIGURE 13 has an accurate inner diameter, whereas that produced by the apparatus according to FIGURE 21 has an accurate outer diameter, while—due to the flexibility of the molding core 51—its inner diameter may slightly vary.

FIGURE 20 indicates that, by appropriate structural modifications, not shown, the apparatus according to FIGURE 13 or 21 may be operatively associated with another apparatus of the same kind and with two molding cores 49 so as to produce two walls each enclosing one core 49 and joined to each other by a central connecting web or partition 52.

The arrangement according to FIG. 22 serves for the production of hollow bodies with longitudinal webs or paritions from three resin impregnated fiber webs 9, 55 and 13, fiber web 55 being drawn from a roll or drum 54. Molding cores or forming bodies 56 are arranged side by side and are separated laterally by gaps 57, these gaps corresponding to the thickness of the web 55. The fixing or anchoring points 35 of the two laterally outer bands 34 are offset in height relative to the fixing point 35 of the intermediate holding band 34. The two outer holding bands 34 enter between fiber webs 9 and 55, and the intermediate holding band 34 enters between fiber webs 55 and 13. Due to this arrangement, the middle fiber web 55 is deformed in the manner shown in FIG. 25. Perpendicular webs or partitions are formed, of which the transverse webs bear alternatively on the fiber webs 9 and 13 and are united with the webs by the hardening operation. In this example, the laminate is guided between a lower mold 25 and an upper mold 26. The heating source for the hardening operation is indicated by radiator 58.

For manufacturing the desired products, it is important first to arrange the supporting bands 34, for a plurality of molding cores, in two different vertically spaced planes, to connect the laterally adjacent bands of one plane with laterally alternate molding cores and laterally adjacent bands of the other plane with laterally intermediate molding cores between the alternate cores, and to feed a flat web 55 of glass-fiber reinforced synthetic resin between the planes of the two sets of supporting bands 34 to laterally alternating upper and lower sides of the molding cores.

FIG. 26 shows a cross section of a product in which the webs are formed from separate strips 155 of the middle fiber web 55 and which, because of the corresponding construction of the molding cores 56, are not perpendicular but are oblique. In this case also, the webs or partitions are again united by upper and lower sections to the outer webs.

FIGS. 27–30 explain the production of the partitions when using three fiber webs, by means of expandable molding cores 60, 61 and 62 which are in staggered relation to each other and which are initially collapsed, as shown in FIG. 27 at 60. These cores are deformed by expansion into a cylindrical cross section or a rectangular cross section. FIG. 29 indicates such an expandable molding core for forming rectangular cavities between the partitions 83.

FIG. 24 illustrates a development of the apparatus of FIG. 13, and shows a rigid molding core 56 which is adjoined by an expandable extension 65 consisting, for example, of a plastics material into which a medium under pressure can be supplied through a bore 66 via holding member 34. The result obtained is that the molding core can contract to allow for shrinkage which occurs with the hardening of the synthetic resin. In addition, with this constructional example, the pair of rollers 48 is not situated in front of the point where the laminate runs on the molding core, as in FIG. 13, but in a zone in which the laminate has already run onto the molding core, as will be apparent from FIG. 24.

It is sometimes desirable for the hollow body formed with internal cavities and partitions to be corrugated within itself, as shown in FIG. 31. The embodiment of the apparatus shown in FIGS. 32, 33 and 34 is expedient for this purpose. The lower molding surface is, in this case, formed by a corrugated platform 85, whose peaks have associated therewith upper mold parts 70. Situated between mold parts 70 or above the troughs of platform 85, there are yieldable loading bodies 67 each consisting of a yieldable sleeve 69 and a yieldable filling 68, for example, sand or iron granules. The bodies 67 are connected cantilever fashion to levers 73 by means of bands 74 and levers 73 are secured to mold parts 70 and carry rollers 72 bearing on the upper surface of the laminate. As the laminate is drawn between the loading bodies 67 and the lower platform 85, the hollow body assumes the shape shown in FIG. 31.

FIGURE 35 illustrates an apparatus which, although generally similar to that according to FIGURE 13, differs therefrom primarily by the fact that the plastic layers 40 and 41, which cover the upper and lower sides of the supporting strip 34, are held stationary by securing means 76 at their front ends, while their rear parts 77 enclose the molding core 37 so as to prevent a direct contact of the webs 9 and 13, of resin-impregnated reinforcing material, with the molding core 37. The end parts 77 of the covering plastic layer 40, 41 then serve as slideways for the webs 9 and 13.

FIGURES 36 and 37 show an apparatus which is similar to that according to FIGURES 22 and 23. It differs therefrom primarily by the fact that the molding cores 60 consist of a flexible material and that these cores and the mold 25 extend in a vertical direction, or at least in an upward direction. The turn from the horizontal direction of movement of the flat tubular body toward the mold 25 and the molding cores 60 occurs between the pair of rolls 48. Cores 60 are expanded by the static pressure of a liquid supplied to them through a hose 80. This apparatus has the advantage of taking up a relatively small floor space and that the liquid filled flexible molding core will remain in full engagement with the expanded molded body despite the shrinkage of its materials while hardening. This angular position of the mold, according to either FIGURE 36 or FIGURE 1a, relative to the horizontal line of production of the laminated material may, of course, also be applied in any of the other described embodiments, and it is especially of advantage in the manufacture of elements of a considerable width with a large number of cavities or channels which are separated by partitions which are produced by employing a fibrous material which is capable of being considerably stretched transversely.

Having thus fully disclosed our invention, what we claim is:

1. A method of producing articles formed with internal channels, from fibrous material impregnated with a fluid, curable, synthetic resin, comprising the steps of: applying a first layer of said synthetic resin impregnated fibrous material on a layer of sheet plastic material; applying a second layer of said synthetic resin impregnated fibrous material on said first layer thereof; applying a third layer of said synthetic resin impregnated fibrous material on said second layer thereof; applying a second layer of sheet plastic material on said third layer of synthetic resin impregnated fibrous material; introducing molding means, spaced laterally over the width of said layers, alternately between said first and second layers of synthetic resin impregnated fibrous material and between said second and third layers of synthetic resin impregnated fibrous material to expand the article by pressing said first and third layers of synthetic resin impregnated fibrous material and the associated layers of sheet plastic material against external molding means to transform said second layer of synthetic resin impregnated fibrous material into partitions extending between said first and third layers of synthetic resin impregnated fibrous material; and then curing the thus formed channeled article.

2. A method, as claimed in claim 1, wherein the second layer of fibrous material is easily stretchable laterally across its width but has limited stretchability longitudinally thereof.

3. A method, as claimed in claim 1, wherein the second layer of fibrous material comprises separate strips corresponding to the number of partitions to be formed within the article.

4. A method, as claimed in claim 1, wherein said molding means are staggered relative to each other in a vertical direction.

5. A method, as claimed in claim 1, including the step of imparting a corrugated contour to the hollow article, with the corrugations extending longitudinally of the hollow article.

6. A method, as claimed in claim 1, in which rigid inherently stable molding bodies are introduced, in the manner defined, as said molding means.

7. A method, as claimed in claim 1, in which tubular expansible molding means, in collapsed condition, are introduced in the manner described and are then expanded to press said first and third layers of synthetic resin impregnated fibrous material and the associated layers of the sheet plastic material against the outer molding means and to transform the second layer of synthetic resin impregnated fibrous material into partitions extending between said first and third layers thereof.

8. A method, as claimed in claim 7, including the step of expanding said collapsed tubular molding means by introducing thereinto a medium producing an internal pressure therein.

9. A method, as claimed in claim 8, including the step of expanding said collapsed tubular molding means by introducing thereinto a gaseous medium under pressure.

10. A method, as claimed in claim 8, including the step of expanding said collapsed tubular molding means by introducing thereinto a fluid medium under pressure.

11. Apparatus for producing channeled hollow articles from fibrous material impregnated with a fluid, curable synthetic resin, said apparatus comprising, in combination, a substantially flat forming surface; means feeding, into superposed relation on said surface, three superposed layers of such synthetic resin impregnated fibrous material and two layers of sheet plastic material, with the superposed layers of fibrous material being interposed between the two layers of sheet plastic material; molding means spaced apart laterally of said superposed layers and introducible, in alternation with respect to adjacent molding means, between the upper and intermediate layers of synthetic resin impregnated fibrous material and between the intermediate and bottom layers of synthetic resin impregnated fibrous material; outer molding surface means engageable by said layers of sheet plastic material upon introduction of said molding means into said superposed layers of synthetic resin impregnated fibrous material; said molding means pressing the top and bottom layers of synthetic resin impregnated fibrous material and the associated layers of sheet plastic material against said molding surface means to transform the intermediate layer of synthetic resin impregnated fibrous material into partitions extending between the top and bottom layers of synthetic resin impregnated fibrous material; and means operable to cure the thus-formed channeled article.

12. Apparatus, as claimed in claim 11, in which said introducible molding means are rigid inherently stable molding means.

13. Apparatus, as claimed in claim 12, including respective flexible holding elements connected to each of said introducible molding means and secured to a fixed point upstream of the zone of superposition of said layers.

14. Apparatus, as claimed in claim 11, wherein outer molding means comprises at least one heated corrugated plate operable to mold the still flexible channeled article before curing thereof.

15. Apparatus, as claimed in claim 11, in which said introducible holding means can be expanded by internal pressure.

16. Apparatus, as claimed in claim 15, wherein said introducible molding means are collapsed expansible tubes.

17. Apparatus, as claimed in claim 16, including liquid column means connected to said tubes to expand the latter by pressure exerted by the liquid.

18. Apparatus, as claimed in claim 16, wherein said tubes are movable with a laminate comprising said superposed layers; and means compressing said tubes in advance of said outer molding surface means.

References Cited

UNITED STATES PATENTS

| | | | |
|---|---|---|---|
| 3,071,180 | 1/1963 | Finger et al. | 156—519 |
| 3,234,309 | 2/1966 | Graff | 264—95 |
| 1,794,435 | 3/1931 | Barth | 264—296 |
| 2,694,661 | 11/1954 | Meyer | 156—180 |
| 2,784,763 | 3/1957 | Shorts | 156—85 |
| 2,905,580 | 9/1959 | Kreier | 156—265 |
| 2,958,364 | 11/1960 | Thompson | 156—201 |
| 3,138,506 | 6/1964 | Ross | 156—285 |
| 3,177,105 | 4/1965 | Wittshire | 156—285 |

HAROLD ANSHER, Primary Examiner

H. F. EPSTEIN, Assistant Examiner

U.S. Cl. X.R.

156—210, 242, 292, 462, 500; 264—95, 173